United States Patent [19]

Peng

[11] 4,264,366
[45] Apr. 28, 1981

[54] CANCELLATION AND MARKING INKS

[75] Inventor: Joseph Y. Peng, Rockville, Md.

[73] Assignee: United States Postal Service, Washington, D.C.

[21] Appl. No.: 968,137

[22] Filed: Dec. 11, 1978

[51] Int. Cl.³ ............................................. C09D 11/10
[52] U.S. Cl. ................................. 106/22; 106/287.19; 260/33.2 R; 260/33.4 R
[58] Field of Search .......................... 106/22, 287.19; 260/33.2 R, 33.4 R

[56] References Cited

U.S. PATENT DOCUMENTS

| 2,966,419 | 12/1960 | Anderson | 106/23 |
| 3,705,045 | 12/1972 | Nadolski | 106/22 |
| 3,870,528 | 3/1975 | Edds et al. | 106/22 |
| 3,875,105 | 4/1975 | Daugherty et al. | 260/33.2 R |

Primary Examiner—Earl A. Nielsen
Attorney, Agent, or Firm—Theodore Major

[57] ABSTRACT

A new bleed, smudge and eradication resistant ink composition for use in the cancellation of stamps and marking of paper products consisting essentially of 2-ethyl-1,3-hexanediol, polyethylene glycol having a molecular weight in the range of 380 to 420, C.I. Solvent Black 28, triethanolamine chelate of orthotitanic acid, octyl-phenoxy polyethoxy ethanol having 5 ethylene oxide units, and octyl-phenoxy polyethoxy ethanol having 9 to 10 ethylene oxide units.

9 Claims, No Drawings

CANCELLATION AND MARKING INKS

BACKGROUND OF THE INVENTION

This invention pertains to a new cancellation and marking ink composition which substantially completely eliminates bleeding, smudging and eradication after its application to paper products such as stamps, envelopes and post cards.

Inks used currently in the cancellation and marking of stamps are fairly easily eradicated, thus, allowing reuse of stamps after proper cancellation and marking. Such inks suffer from sludging, setting and poor wetting in their routine use which also results in easier eradication and reuse.

The currently used carbon based inks can be easily removed from many stamps simply by washing the stamps with soap and water. This is particularly true immediately after start-up when the currently used inks tend to dry and harden on the feed rollers overnight, resulting in up to 5,000 very poor cancellations before the system begins to work properly.

The ink and the inking felt maintenance costs run approximately two million dollars per year; but in solving the maintenance problems, several complicating factors rule out the use of routine commercial inks. For example, the cancelling ink must give a clear postmark on all types of paper including plastic coated papers. Further, it must make a permanent cancelling mark on stamps which have been coated with three different types of varnish. Still further, it must not dry in the inking rollers when the machines are idle for periods up to forty-eight hours but it must dry instantly on the envelope to avoid damages.

This invention encompasses the use of 2-Ethyl-1,3-Hexanediol, Polyethylene Glycol and Diethylene Glycol to dissolve monoazochrome complex organic dyes in formulating the new ink composition solution. Upon being dispersed onto a printing surface, this ink composition dissolves the paper surface grains and diffuses into restricted fiber pores, giving a dark and permanent cancellation mark. Thus, it allows substantially complete elimination of eradication of cancellation markings by use of common solvents, such as, water, alcohols, bleach, etc.

The new ink composition ingredients can be obtained commercially or prepared by any of the commonly known methods.

One method of preparation of the new ink composition is as follows and all functional components are shown in percent by weight in the various examples:

| Functional Component | A | B | C | Percent by Weight Ranges |
|---|---|---|---|---|
| 2-Ethyl-1, 3-Hexanediol | 40.0 | 40.0 | 40.0 | 20.0–60.0 |
| Carbowax PEG-400 | 27.0 | 27.0 | 27.0 | 20.0–40.0 |
| Orasol Black CN | 14.3 | 14.3 | 17.0 | 8.0–20.0 |
| Quadrol | 10.0 | 10.0 | 7.5 | 0.0–15.0 |
| Diethylene Glycol | 5.0 | 5.0 | 4.7 | 0.0–10.0 |
| Tyzor TE | 0.5 | 0.5 | 0.57 | 0.25–1.5 |
| Triton X-45 | 1.6 | 1.6 | 1.6 | 1.0–6.0 |
| Triton X-100 | 1.6 | 1.6 | 1.6 | 1.0–6.0 |
| Calcofluor White RWP | 0.0 | 0.05 | 0.05 | 0.01–0.05 |

The Orasol Black CN is mixed, blended and dissolved in Carbowax PEG-400 and 2-Ethyl-1,3-Hexanediol. Quadrol and Diethylene Glycol are then added to this solution for control of viscosity, if needed. Wettability adjustment agents, Triton X-45 and Triton X-100 are added and the mixture is further blended. These agents also allow for a smoother and an easier mixing composition. Quadrol and Diethylene Glycol are added to adjust viscosity for specific application. A curing agent, Tyzor TE, and Calcofluor White RWP, a crime identification agent, are added to the solution as the last mixing step. The materials are mixed thoroughly at a temperature of between about 0° F. to 135° F. The new ink composition is a true solution and used as such.

The various components are defined as follows:

(a)-Quadrol is a N,N,N',N'-tetrakis (2-hydroxypropyl)-ethylene diamine. This material is used as a viscosity adjustment agent and a corrosion inhibitor. Another agent that can be used as a viscosity adjustment agent is Dowanol EPH (mixed phenyl ethers of ethylene glycol and diethylene glycol. Often diethylene glycol is used in conjunction with Quadrol to adjust the viscosity to match machine speed use requirement/s.

(b)-Triton X-45 and Triton X-100 are octyl-phenoxy polyethoxy ethanols, each having 5 and 9-10 ethylene oxide units respectively and are used as surfactants or wettability adjustment agents.

(c)-Tyzor TE is triethanolamine chelate of orthotitanic acid and is used as a crosslinking mechanism to cure the ink composition.

(d) Calcofluor White RWP is also known as C.I. Fluorescent Brightening Agent 61. Calcofluor White RWP, a trademark of American Cyanamid Corporation, and Uvitex OB and Tinopal PCR, trademarks of Ciba-Geigy Corporation, are used either singly or in combination to show positive tracer identification of the Postal Service ink applied (the latter two components are equivalents of Calcofluor White RWP). Uvitex OB and Tinopal PCR are not otherwise identified by the manufacturer.

(e)-Carbowax PEG-400 is a specific Polyethylene glycol having a specified number of methylene groups in its chain and is of approximate molecular weight between 380 and 420.

(f)-Orasol Black CN also known as C.I. Solvent Black 28, is a metalliferous azo-dyestuff as taught and claimed in British Specification No. 924,520, complete Specification published April 24, 1963.

The following pictorial examples illustrate the new ink composition and its ability to substantially eliminate eradication;

Sample Using 914A Ink Cancellations

The stamp cancellations illustrated in this example show substantially all the colors routinely used in the manufacturing of stamps. Further, this example shows that after soaking the cancelled stamps in Clorox bleach for thirty (30) minutes and then thoroughly rinsing in water three (3) times, the cancellation markings are legible to an extent of clear readability to the naked eye.

Example Using 914A Ink Cancellations—When Applied by Trail Scottfelt vs. Natural Animal Hair The Trail Scottfelt is an ink distribution means that gives a uniform cell size diffusion paths for the ink. It is made of open pore and pressure compacted polyurethane foam. The tests show wearability 5-6 times longer at a cost of only 20% more than the currently used natural animal hair means. Moreover, this example, again shows use of substantially all the colors routinely used in the manufacturing of stamps and using the same solvent and rinsing as the previous example, with all cancellation markings showing clear readability to the naked eye.

Example Using 914B Ink Cancellations

The stamp cancellations illustrated in this example show substantially all the colors routinely used in the manufacturing of stamps. This example illustrates that after soaking in 1-Butyl Alcohol and thoroughly rinsing three (3) times in water, the cancellation markings are legible to an extent of clear readability to the naked eye.

Example Using 914C Ink Composition

The stamp cancellations illustrated in this example show substantially all the colors routinely used in the manufacturing of stamps. This example illustrates that after soaking in Clorox for thirty (30) minutes and thoroughly rinsing in water three (3) times, the cancellation markings are legible to an extent of clear readability to the naked eye.

The new ink composition solution, due to its very low, inert reactivity and vapor pressure in atmospheric condition, may be used in various other systems, such as, ball point pens, porous point pens and ink pad application for marking.

While this invention has been described with respect to a number of specific embodiments, it is obvious there are other variations and modifications which may be resorted to without departing from the spirit of the invention as more particularly pointed out in the appended claims.

I claim:

1. A bleed, smudge and eradication resistant ink composition consisting essentially of the following functional components: 2-ethyl-1,3-hexanediol, polyethylene glycol having a molecular weight in the range of 380 to 420, C.I. Solvent Black 28, triethanolamine chelate of orthotitanic acid, octyl-phenoxy polyethoxy ethanol having 5 ethylene oxide units, octyl-phenoxy polyethoxy ethanol having 9–10 ethylene oxide units and C.I. Fluorescent Brightening Agent 61.

2. A bleed, smudge and eradication resistant ink composition consisting essentially of the following functional components: 2-ethyl-1,3-hexanediol, polyethylene glycol having a molecular weight in the range of 380 to 420, C.I. Solvent Black 28, N,N,N',N'-tetrakis (2-hydroxypropyl) ethylene diamine, diethylene glycol, triethanolamine chelate of orthotitanic acid, octyl-phenoxy polyethoxy ethanol having 5 ethylene oxide units, octyl-phenoxy polyethoxy ethanol having 9–10 ethylene oxide units and C.I. Fluorescent Brightening Agent 61.

3. A bleed, smudge and eradication resistant ink composition for printing on non-uniform, high speed processed paper products consisting essentially on a percent weight basis of at least about 20% 2-ethyl-1,3-hexanediol, at least about 20% polyethylene glycol having a molecular weight in the range of 380 to 420, at least about 8% C.I. Solvent Black 28, at least about 0.25% triethanolamine chelate of orthotitanic acid, at least about 1.0% octyl-phenoxy polyethoxy ethanol having 5 ethylene oxide units, and at least about 1.6% octyl-phenoxy polyethoxy ethanol having 9 to 10 ethylene oxide units.

4. A bleed, smudge and eradication resistant ink composition for printing on non-uniform, high speed processed paper products consisting essentially on a percent weight basis of at least about 20% 2-ethyl-1,3-hexanediol, at least about 20% polyethylene glycol having a molecular weight in the range of 380 to 420, at least about 8% C.I. Solvent Black 28, at least about 7.5% N,N,N',N'-tetrakis (2-hydroxypropyl) ethylene diamine, at least about 4.7% diethylene glycol, at least about 0.25% triethanolamine chelate of orthotitanic acid, at least about 1.0% octyl-phenoxy polyethoxy ethanol having 5 ethylene oxide units and at least about 1.6% octyl-phenoxy polyethoxy ethanols having 9 to 10 ethylene oxide units.

5. A bleed, smudge and eradication resistant ink composition for printing on non-uniform, high speed processed paper products consisting essentially on a percent weight basis of at least about 20% 2-ethyl-1,3-hexanediol, at least about 20% polyethylene glycol having a molecular weight in the range of 380 to 420, at least about 8.0% C.I. Solvent Black 28, at least about 7.5 N,N,N',N'-tetrakis (2-hydroxypropyl) ethylene diamine, at least about 0.5% triethanolamine chelate of orthotitanic acid, at least about 4.7% diethylene glycol, at least about 1.6% octyl-phenoxy polyethoxy ethanol having 5 ethylene oxide units and at least about 1.6% octyl-phenoxy polyethoxy ethanol having 9 to 10 ethylene oxide units.

6. A bleed, smudge and eradication resistant ink composition consisting essentially of the following functional components: 2-ethyl-1,3-hexanediol, polyethylene glycol having a molecular weight in the range of 380 to 420, C.I. Solvent Black 28, triethanolamine chelate of orthotitanic acid, octyl-phenoxy polyethoxy ethanol having 5 ethylene oxide units and octyl-phenoxy polyethoxy ethanol having 9–10 ethylene oxide units.

7. An ink composition as claimed in claim 6 including at least one fluorescent brightening agent.

8. An ink composition as claimed in claim 7 in which said brightening agents can be used either singly or in any combination.

9. A bleed, smudge and eradication resistant ink composition for printing on non-uniform, high speed processed paper products consisting essentially on a percent weight basis of at least about 40% 2-ethyl-1,3-hexanediol, at least about 27% polyethylene glycol having a molecular weight in the range of 380 to 420, at least about 17% C.I. Solvent Black 28, at least about 7.5% N,N,N',N'-tetrakis (2-hydroxypropyl) ethylene diamine, at least about 4.7% diethylene glycol, at least about 0.55% triethanolamine chelate of orthotitanic acid, at least about 1.6% octyl-phenoxy polyethoxy ethanol having 5 ethylene oxide units, at least 1.6% octyl-phenoxy polyethoxy ethanol having 9 to 10 ethylene oxide units and at least about 0.05% C.I. Fluorescent Brightening Agent 61.

* * * * *

UNITED STATES PATENT AND TRADEMARK OFFICE
CERTIFICATE OF CORRECTION

PATENT NO.  : 4,264,366
DATED       : April 28, 1981
INVENTOR(S) : Joseph Y. Peng It is certified that error appears in the above-identified patent and that said Letters Patent are hereby corrected as shown below:

Col. 1, line 35, delete "Ethyl" and insert --ethyl--;
      line 36, delete the line in its entirety and insert --hexanediol, polyethylene glycol and diethylene gly- --;
      line 67, delete "2-Ethyl-1,3-Hexanediol" and insert --2-ethyl-1,3-hexanediol--;
      line 68, delete "Diethylene Glycol" and insert --diethylene glycol--;

Col. 2, line 5, delete "Diethylene Glycol" and insert --diethylene glycol--;
      line 20, delete "requirement/s" and insert --requirements--;
      line 38, delete "Polyethylene" and insert --polyethylene--;
      line 42, after "CN" insert a comma;
      line 46, delete "pictorial";
      line 55, delete "thorougly" and insert --thoroughly--;

Col. 3, line 10, delete "Butyl Alcohol" and insert --butyl alcohol--;
      line 13, delete "Composition" and insert --Cancellations--.

Signed and Sealed this

Twenty-first Day of July 1981

[SEAL]

Attest:

GERALD J. MOSSINGHOFF

Attesting Officer      Commissioner of Patents and Trademarks